Patented June 24, 1930

1,766,948

UNITED STATES PATENT OFFICE

MORDECAI MENDOZA AND KENNETH HERBERT SAUNDERS, OF MANCHESTER, ENGLAND, ASSIGNORS TO BRITISH DYESTUFFS CORPORATION LIMITED, OF MANCHESTER, ENGLAND

MORDANT AZO DYESTUFFS

No Drawing. Application filed September 29, 1926, Serial No. 138,567, and in Great Britain November 13, 1925.

In a copending application of one of us (Saunders) Ser. No. 53,404, filed August 29, 1925, there is described a new class of azo dyestuffs adapted for mordant dyeing without substantial change in shade. These new azo dyestuffs are mixed diaryl sulphones which are characterized by having the chelate group separated from and connected to the chromophoric portion of the dyestuff by a sulphone bridge; the sulphone bridge acting as a chromophoric screen. Hence, when these new dyestuffs are fixed on animal or vegetable fibers by metallic mordants little or no change in shade occurs where oxidizable structure or structures which give deeply colored metallic lakes are absent. Such dyestuffs as a generic class may be represented by the general formula

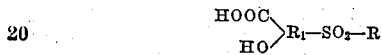

wherein $R_1$ represents a benzene residue and R represents a benzene or naphthalene residue having an azo group attached thereto, the grouping represented by R possessing chromophoric properties and in which the —OH and —COOH groups attached to the $R_1$ are ortho to each other.

Such azo dyestuffs may be derived from intermediates which are mixed diaromatic sulphones having the general formula

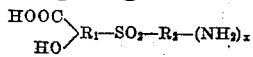

wherein $R_1$ represents a benzene residue and $R_2$ represents a benzene or naphthalene residue, both of which may be further substituted, $x$ is 1 or 2 and in which the —OH and —COOH groups attached to the $R_1$ are ortho to each other. These intermediates are new in themselves and in certain other and copending applications Ser. Nos. 303,371 and 398,805, filed as divisions of the acknowledged application Ser. No. 53,404, intermediates of this general class are set forth and claimed. Application Ser. No. 303,371 specifically relates to the diamine diaryl sulphones of the general class indicated above.

In the acknowledged application Ser. No. 53,404 methods of producing the new intermediates are also disclosed. Mixed amino diaryl sulphones are produced by condensing ortho hydroxy-carboxy aryl sulphinic acids with aromatic nitro compounds containing a labile halogen atom, and then reducing the nitro diaryl sulphone so produced to form the amino diaryl sulphone. Sulphino salicylic acid, its homologues, (such as sulphino ortho or para cresotinic acid) or substitution products (such as sulphino halogeno salicylic acids) may be used. Mono and dinitrochlorbenzenes may be used, for instance 2:4-dinitrochlorbenzene.

Said copending application Ser. No. 53,404 is specifically directed to azo dyestuffs derived from the mono amino diaryl sulphones and the diamino diaryl sulphones in which one of the amino groups has been acylated, such amino sulphones being the first component of the dyestuff.

Our present invention relates to further developments in the production of azo dyestuffs adapted to mordant dyeing without substantial change in shade when fixed on the fiber, and it relates to a certain class of azo dyestuffs of this general character. This certain class of azo dyestuffs may be represented by the general formula

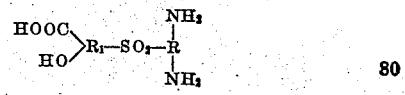

wherein $R_1$ represents a benzene residue and R represents a benzene or naphthalene residue having an azo group attached thereto, the group represented by R possessing chromophoric properties and in which the —OH and —COOH groups attached to the $R_1$ are ortho to each other. Such azo dyestuffs may be derived from the general class of diamino diaryl sulphones claimed in Ser. No. 303,371. These diamino diaryl sulphones may be represented by the general formula

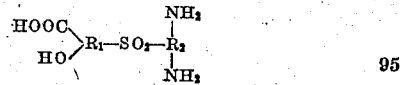

wherein $R_1$ represents a benzene residue and $R_2$ represents a benzene or naphthalene residue, both of which may be further substituted, and in which the —OH and —COOH groups attached to the $R_1$ are ortho to each other. Various methods may be used to convert the diamino diaryl sulphones into the dyestuffs. These diamino diaryl sulphone intermediates readily couple with diazo compounds of all types to yield dyestuffs which, with increasing complexity deepen in shade from yellow and brown towards the blue end of the spectrum. Mono and polyazo dyestuffs may be produced. The finished dyestuff molecule may contain a molecule of one or more of the same or different diamino sulphones. Any of the methods known to dyestuff technology may be employed in building up the new dyestuffs including for example the formation of dyes of the Bismarck brown type by the action of nitrous acid upon excess of a diamino sulphone of the nature described.

The following compounds are examples of the general class of diamine compounds disclosed in acknowledged copending application Ser. No. 53,404 and which may be used in our invention.

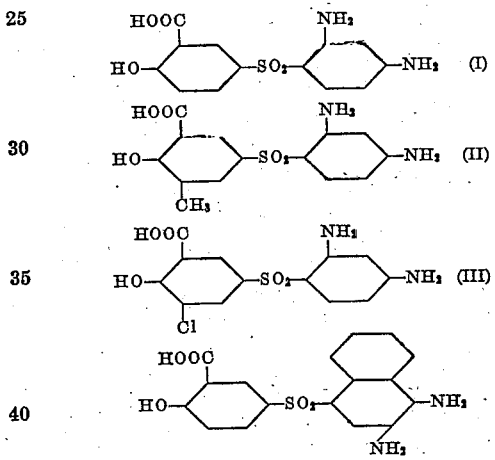

We have found that diamines of the general class to which the above diamines belong couple readily with diazo compounds, including in this term, diazotized monoamino compounds and tetrazotized diamino compounds which are suitable as azo dye components. Monoazo dyes are produced when diazotized monoamino compounds are coupled with the diamine. These monoazo dyes may be represented by the general formula $$\begin{matrix}HOOC\\HO\end{matrix}\!\!>\!\!R_1\!-\!SO_2\!-\!\underset{\underset{NH_2}{|}}{\overset{\overset{NH_2}{|}}{R_2}}\!-\!N\!=\!N\!-\!R_8$$

wherein $R_1$ represents a benzene residue and $R_2$ represents a benzene or naphthalene residue, both of which may be further substituted, and $R_8$ represents a coupled azo dye component from a diazo compound and in which the —COOH and —OH groups attached to the $R_1$ are ortho to each other. Disazo dyestuffs are produced when tetrazotized diamino compounds are coupled with the diamino diaryl sulphone. These disazo dyes may be represented by the general formula $$\begin{matrix}HOOC\\HO\end{matrix}\!\!>\!\!R_1\!-\!SO_2\!-\!\underset{\underset{NH_2}{|}}{\overset{\overset{NH_2}{|}}{R_2}}\!-\!N\!=\!N\!-\!R_6\!-\!N\!=\!N\!-\!\underset{\underset{NH_2}{|}}{\overset{\overset{NH_2}{|}}{R_2}}\!-\!SO_2\!-\!R_1\!\!<\!\!\begin{matrix}COOH\\OH\end{matrix}$$

wherein $R_1$ represents a benzene residue and $R_2$ represents a benzene or naphthalene residue, both of which may be further substituted, $R_6$ represents a coupled azo dye component, and in which the —COOH and —OH groups attached to the $R_1$ are ortho to each other. Disazo dyes may be also made by other methods. The monoazo dyes produced as indicated above may be given further treatment to convert them into disazo dyes. For instance the diazotized monoamino compound may contain a nitro group which after coupling with the diamino sulphone may be reduced and diazotized and coupled with a suitable azo dye coupling component to produce a disazo dye. Such disazo dyes may be represented by the general formula

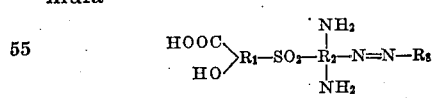

wherein $R_1$ represents a benzene residue and $R_2$ represents a benzene or naphthalene residue, both of which may be further substituted, and $R_9$ and $R_7$ represent coupled residues of azo dye components.

A generic formula which can be used to represent both the mono and the disazo dyes of our invention is:

$$\begin{matrix}HOOC\\HO\end{matrix}\!\!>\!\!R_1\!-\!SO_2\!-\!\underset{\underset{NH_2}{|}}{\overset{\overset{NH_2}{|}}{R_2}}\!-\!Y$$

wherein $R_1$ and $R_2$ have their previous significance and Y represents a substituent group such as $-N=N-R_8$ or $-N=N-R_8-N=N-R_7$ wherein $R_8$ and $R_7$ are coupled residues of azo dye components.

Under the present invention monoazo and disazo dyes of various types may be produced, all of which have a characteristic structural arrangement which permits their use in mordant dyeing without substantial change in shade when fixed on the fiber. The present application is specifically directed to monoazo dyes. Our copending application Ser. No. 303,366 which is a division of the present application, is specifically directed to the disazo dyes. We have herein disclosed the broad scope of our invention and the following examples are given as specific illustrations of the broad invention and these examples in no way limit the scope of the invention. The parts are given by weight.

*Example I*

17.3 parts of sulphanilic acid are dissolved in 500 parts of water by means of 5.6 parts of soda ash and the solution run with stirring into 25.5 parts of a solution of hydrochloric acid (36 per cent) diluted with 250 parts of water. Diazotization is then carried out at 5° C. with 6.9 parts of sodium nitrite dissolved in 50 parts of water. The diazo suspension is run down into a solution of 30.8 parts of the diamino sulphone I, dissolved in 500 parts of water and 35 parts of soda ash at 5-10° C. Coupling is rapid and when complete the dyestuff is salted out, filtered off and dried.

The new dyestuff is an orange powder, having the probable constitution:

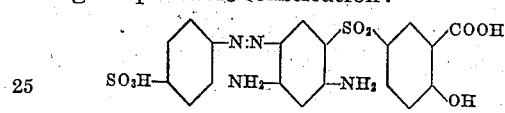

Wool is dyed golden orange from an acid bath, becoming greener on after-chroming, whereupon the dyeing becomes fast to milling and its kindred processes. Printed on cotton with a chrome mordant it yields golden orange shades fast to warm soap.

Working in the same manner as above, and with equivalent quantities, metanilic acid yields a dyestuff of a slightly greener shade, naphthionic acid a bright orange and p-nitraniline-o-sulphonic acid a yellowish-red, all the prints being fast to warm soap when applied to cotton with a chrome mordant.

*Example II*

21.8 parts of p-nitraniline-o-sulphonic acid are dissolved in 500 parts of water with 5.6 parts of soda ash. The solution after cooling is run slowly into 25.5 parts of a solution of hydrochloric acid (36 per cent) diluted with 250 parts of water. Diazotization is carried out at 0-5° C. by 6.9 parts of sodium nitrite dissolved in 50 parts of water. When diazotization is complete the diazo compound is run down with stirring into a solution of 30.8 parts of diamino-sulphone I, dissolved in 550 parts of water with 56 parts of sodium bicarbonate at 5-10° C.

After about one hour there is added a solution of 50 parts of crystallized sodium sulphide in 50 parts of water. Reduction proceeds with rise of temperature to 15-20° C. and this is maintained for a further four hours. The solution is then rendered neutral with hydrochloric acid followed by a further addition of 25.5 parts of the 36 per cent solution of hydrochloric acid. The second diazotization is carried out at 0-5° C. with 6.9 parts of sodium nitrite dissolved in 50 parts of water. The new diazo compound is then run into a solution of 30.8 parts of the diamino-sulphone I, and 35 parts of soda ash in 500 parts of water at 5-10° C.

The dyestuff is salted out after some hours stirring. It forms when dry a dark reddish-brown powder, which has the probable constitution:

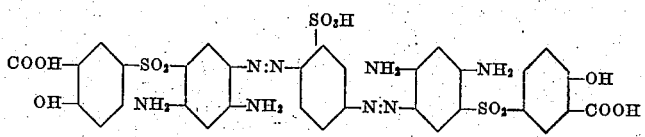

Wool is dyed dark orange from an acid bath becoming browner on chroming and at the same time fast to milling and so forth. Printed on cotton cloth with a chrome mordant there is obtained a reddish-brown shade fast to warm soap.

*Example III*

34.4 parts of benzidine-m-disulphonic acid are dissolved in 500 parts of water with 11 parts of soda ash and after cooling the solution is run down with stirring into 51 parts of a 36 per cent solution of hydrochloric acid. Diazotization is carried out at 5° C. with 13.8 parts of sodium nitrite in 100 parts of water. The tetrazo compound is then run down slowly with stirring into a solution of 61.6 parts of the diamino-sulphone I, in 1000 parts of water and 70 parts of soda ash at 5-10° C. The dyestuff is salted out when combination is complete as shown by the usual tests. It has the probable constitution:

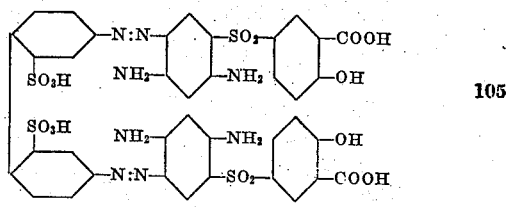

When dry the new dyestuff forms a yellow powder. Wool is dyed deep golden yellow from an acid bath, becoming dull gold on chroming. With a chrome mordant cotton is printed in bright yellow-orange shades fast to warm soap.

What we claim and desire to secure by Letters Patent is:—

1. In the manufacture of azo dyes, the process which comprises coupling a compound containing a diazo group with a diamino diaromatic sulphone having the probable formula

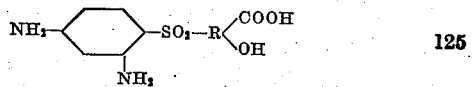

wherein R represents a benzene residue and in which the hydroxyl and carboxyl groups are ortho to each other.

2. As new dye materials, products having in the form of free acid the formula

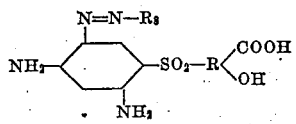

wherein $R_8$ represents an aromatic residue not itself containing an azo group, R represents a benzene residue and in which the —OH and —COOH groups are ortho to each other, the said products being powders soluble in alkali to colored solutions.

3. As new dye materials having in the form of free acid the formula

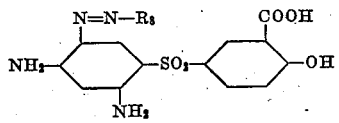

in which $R_8$ represents an aromatic radical, not itself containing an azo group, the said products being soluble in alkali to colored solutions.

4. As a new dye material the product having in the form of free acid the formula

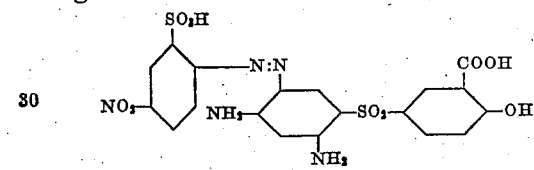

which is a red powder, giving in water a reddish orange solution.

5. Azo dyes carrying a chelate group and adapted for mordant dyeing with the chelate group separated from and connected to the chromophore group by a sulphone bridge, said azo dyes being mixed sulphones having the probable formula

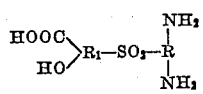

wherein $R_1$ represents a benzene residue and R represents a benzene or naphthalene residue having an azo group attached thereto, the group represented by R possessing chromophoric properties and in which the said residues $R_1$ and R may be further substituted and the —COOH and —OH groups attached to the $R_1$ are ortho to each other, the said dyes producing shades which are substantially unchanged when chromed.

6. Azo dyes carrying a chelate group and adapted for mordant dyeing with the chelate group separated from and connected to the chromophore group by a sulphone bridge, said azo dyes being mixed sulphones having the proble formula

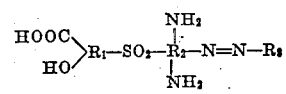

wherein $R_1$ represents a benzene residue and $R_2$ represents a benzene or naphthalene residue, both of which may be further substituted, $R_8$ represents a coupled azo dye component from a diazo compound and in which the —COOH and the —OH groups attached to the $R_1$ are ortho to each other, the said dyes producing shades which are substantially unchanged when chromed.

7. Azo dyes carrying a chelate group and adapted for mordant dyeing with the chelate group separated from and connected to the chromophore group by a sulphone bridge, said azo dyes being mixed sulphones having the probable formula

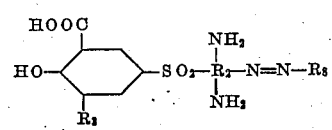

wherein $R_2$ represents a benzene residue, $R_3$ represents hydrogen, or a substituent group and $R_8$ represents a coupled azo dye component from a diazo compound, the said dyes producing shades which are substantially unchanged when chromed.

8. Azo dyes carrying a chelate group and adapted for mordant dyeing with the chelate group separated from and connected to the chromophore group by a sulphone bridge, said azo dyes being mixed sulphones having the probable formula

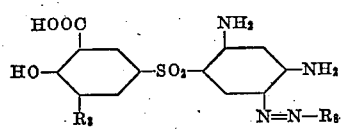

wherein $R_3$ represents hydrogen, chlorine or a methyl group and $R_8$ represents a coupled azo dye component from a diazo compound, the said dyes producing shades which are substantially unchanged when chromed.

9. Monoazo dyes carrying a chelate group and adapted for mordant dyeing with the chelate group separated from and connected to the chromophore group by a sulphone bridge, said monoazo dyes being mixed sulphones having the probable formula

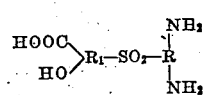

wherein $R_1$ represents a benzene residue and R represents a benzene or naphthalene residue having a monoazo group attached thereto, the grouping represented by R possessing chromophoric properties and in which both $R_1$ and R may be further substituted and the —COOH and —OH groups attached to the $R_1$ are ortho to each other, and the —OH group is para to the sulphone bridge.

10. In the manufacture of azo dyes, the process which comprises coupling a diazo compound with a component having the probable formula

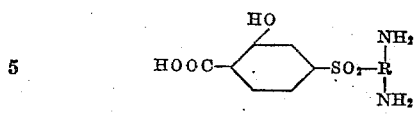

wherein R represents an aromatic residue which may be further substituted.

11. As new products, the azo dyes prepared by coupling a diazo compound with a component having the probable formula

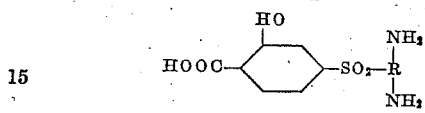

wherein R represents an aromatic residue which may or may not be further substituted.

12. Azo dyes carrying a chelate group and adapted for mordant dyeing with the chelate group separated from and connected to the chromophore group by a sulphone bridge, said azo dyes being mixed sulphones having the probable formula

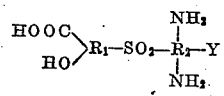

wherein $R_1$ represents a benzene residue and $R_2$ represents a benzene or naphthalene residue, both of which may be further substituted and in which the —OH and the —COOH groups are ortho to each other, and Y represents the substituent group —N=N—$R_3$ or —N=N—$R_3$—N=N—$R_7$, wherein $R_3$ and $R_7$ are coupled residues of azo dye components, the said dyestuffs producing shades which are substantially unchanged when chromed.

In testimony whereof we have signed our names to this specification.

MORDECAI MENDOZA.
KENNETH HERBERT SAUNDERS.